(12) United States Patent  (10) Patent No.: US 7,965,767 B2
Jahanghir et al.  (45) Date of Patent: Jun. 21, 2011

(54) TWO-DIMENSIONAL FILTERING ARCHITECTURE

(75) Inventors: Musa Jahanghir, Palo Alto, CA (US); Prasanna Singamsetty, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1391 days.

(21) Appl. No.: 11/479,301

(22) Filed: Jun. 30, 2006

(65) Prior Publication Data
US 2008/0285642 A1  Nov. 20, 2008

(51) Int. Cl.
  *H04N 7/12* (2006.01)
  *G06K 9/32* (2006.01)
(52) U.S. Cl. .............. 375/240.01; 375/240.29; 382/300
(58) Field of Classification Search ............. 375/240.01, 375/240.02, 240.21, 240.29; 382/254, 300
  See application file for complete search history.

(56) References Cited

U.S. PATENT DOCUMENTS

| 4,857,993 A | * | 8/1989 | Music et al. | ............. 375/240.01 |
| 6,587,592 B2 | * | 7/2003 | Georgiev et al. | ............. 382/254 |
| 7,778,494 B2 | * | 8/2010 | Shastry et al. | ................ 382/300 |
| 2008/0130742 A1 | * | 6/2008 | Scheuermann | ........... 375/240.02 |

OTHER PUBLICATIONS

Wiegand, Thomas, et al. "Overview of the H.2.64/AVC Video Coding Standard", IEEE Transactions on Circuits and Systems for Video Technology, vol. 13, No. 7, pp. 560-576, Jul. 2003.

* cited by examiner

*Primary Examiner* — Gims S Philippe
(74) *Attorney, Agent, or Firm* — Kacvinsky Daisak, PLLC

(57) ABSTRACT

A first filtering module filters actual pixel values in a first direction (e.g., vertically), and a second filtering module filters interpolated pixel values received from the first filtering module in a second direction (e.g., horizontally). Also, a third filtering module filters actual pixels in the second direction. A computation module is coupled to the first, second and, third filtering modules. The computation module generates quarter-sample interpolated pixel values. These values are based on combinations of pixel values selected from actual pixel values and interpolated pixel values received from the first, second and, third filtering modules.

20 Claims, 9 Drawing Sheets

TWO-DIMENSIONAL FILTERING ARCHITECTURE

BACKGROUND

The process of reconstructing a compressed video stream into uncompressed video and audio signals may involve several different algorithms and components. At a high level, these components can be very similar across different standards. For instance many different standards provide motion compensation features involving the translation of reference images.

Motion compensation typically places the highest processing demand on video decoders. Accordingly, techniques are needed to improve the performance of such devices and reduce the processing demands associated with motion compensation.

DETAILED DESCRIPTION

Various embodiments may be generally directed to two-dimensional filtering architectures. In one embodiment, for example, a first filtering module filters actual pixel values in a first direction (e.g., vertically), and a second filtering module filters interpolated pixel values received from the first filtering module in a second direction (e.g., horizontally). Also, a third filtering module filters actual pixels in the second direction. A computation module is coupled to the first, second and, third filtering modules. The computation module generates quarter-sample interpolated pixel values. These values are based on combinations of pixel values selected from actual pixel values and interpolated pixel values received from the first, second and, third filtering modules. In this manner, processing loads and costs are reduced. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
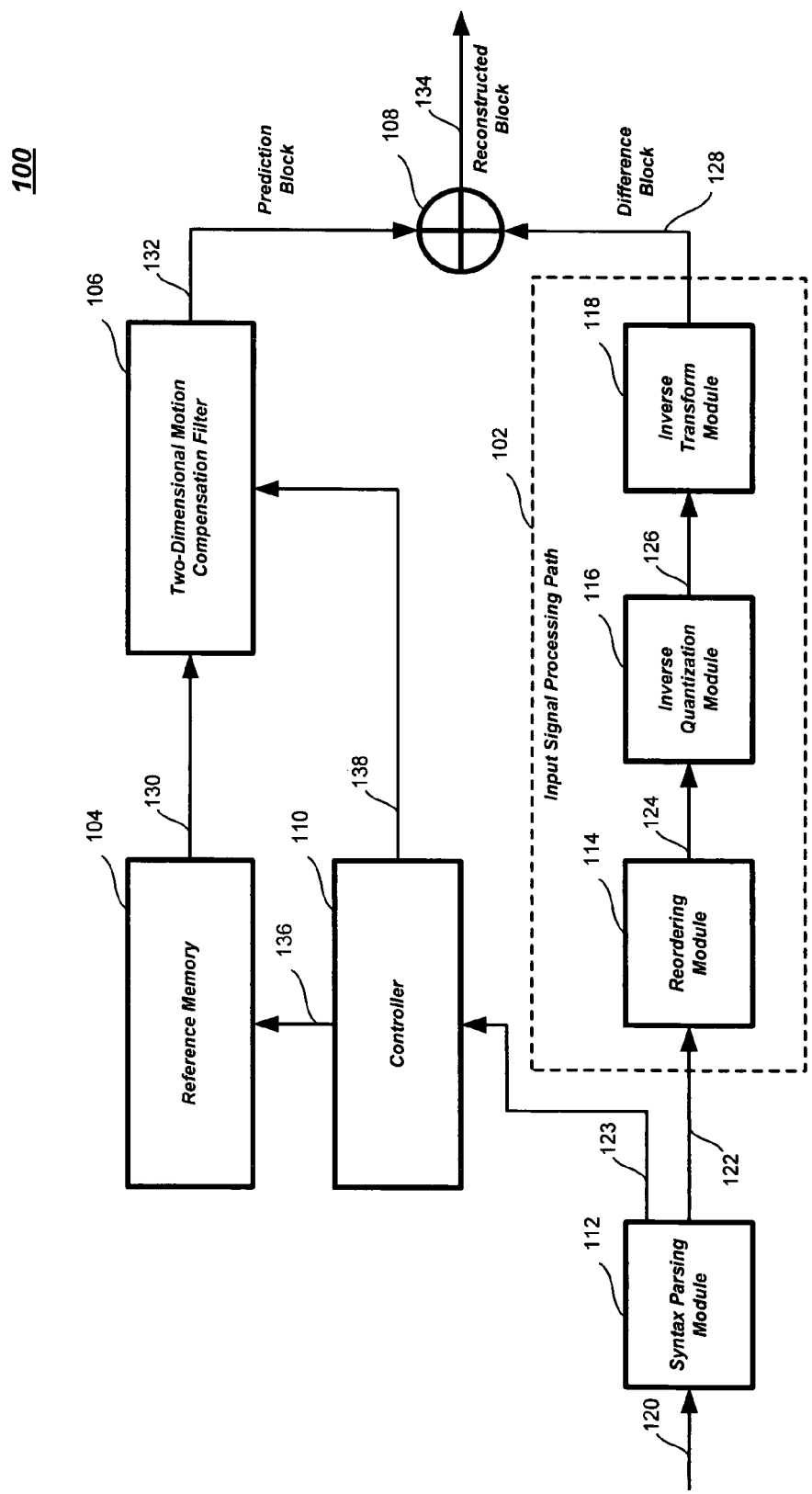
FIG. 1 is a diagram showing an embodiment of an apparatus, which may be used to process encoded image/video signals.

FIG. 1 is a diagram showing an embodiment of an apparatus 100, which may be used to process encoded image/video signals. For instance, this apparatus may receive, decode, and/or display image/video signals. Such processing may employ scalable two-dimensional filtering for various operations.

In so doing, apparatus 100 may employ video/image coding techniques or standards. For example, apparatus 100 may comply, with one or more Moving Pictures Expert Group (MPEG) standards, such as MPEG-2 and MPEG-4. Also, apparatus 100 may comply with one or more standards established by the International Telecommunications Union (ITU) Telecommunication Standardization Sector (ITU-T). Examples of such standards include H.261, H.263, H.264, and Advanced Video Coding (AVC). Alternatively or additionally, apparatus 100 may comply with the VC-1 coding standard. VC-1 is the informal name of the Society of Motion Picture and Television Engineers (SMPTE) standard 421M, which specifies a video codec based on Windows Media Video version 9.

As shown in FIG. 1, apparatus 100 may include various elements. The embodiments, however, are not limited to the elements shown in this drawing. For instance, embodiments may include greater or fewer elements, as well as other arrangements, couplings, or connections among elements.

In particular, FIG. 1 shows that apparatus 100 may include an input signal processing path 102, a reference memory 104, a two-dimensional motion compensation filter 106, a combining node 108, and a controller 110. Also, FIG. 1 shows that input signal processing path 102 may include a syntax parsing module 112, a reordering module 114, an inverse quantization module 116, and an inverse transform module 118. These elements may be implemented in hardware, software, or any combination thereof.

Apparatus 100 may receive an encoded input signal 120, which may represent a predictive coded image frame portion or region referred to herein as a block (usually referred to as macroblocks). An exemplary block size is 16 by 16 image pixels. However, variable size blocks may be employed. From this signal, apparatus 100 may generate a reconstructed image signal block 134.

As shown in FIG. 1, encoded input signal 120 is sent to input signal processing path 102 and controller 110. Within input processing path 102, syntax parsing module 112 may receive encoded input signal 120 and decode it into syntax elements in accordance with its encoding scheme. This scheme may be, for example, an entropy encoding scheme, such as variable length coding (VLC) or context-adaptive variable length encoding (CAVLC). However, the embodiments are not limited to such.

Thus, syntax parsing module 112 sends coefficients 122 to reordering module 114, and a motion vector 123 to controller 110. Reordering module 114 reorders coefficients 122. For instance, this may involve undoing a previous zig-zag ordering process. As a result of this reordering, module 114 produces quantized coefficients 124.

Inverse quantization module 116 receives these quantized coefficients and rescales them. Accordingly, module 116 sends rescaled coefficients 126 to inverse transform module 118. Module 118 performs an inverse transform on rescaled coefficients 126, such as an inverse 4×4 block transform. Exemplary transforms include inverse discrete cosine transforms (DCTs) and the like. However, the embodiments are not limited to such. As a result of such inverse transforms, module 118 generates a difference block 128.

Reference memory 104 stores reference image signal units, referred to as reference blocks. These reference blocks may be from the same source providing input signal 120. Within apparatus 100, the reference blocks may be received through controller 110. Upon receipt of input signal 120, a reference block 130 is selected from reference memory 104. Controller 110 may perform this selection based on motion vector 123. Accordingly, FIG. 1 shows controller 110 sending reference memory 104 a reference block index 136 to make this selection.

From the selected reference block, two-dimensional motion compensation filter 106 generates a prediction block 132. This block may be obtained by displacing an area or all of reference block 130. This displacement feature is referred to as motion compensation. Controller 110 may specify this displacement based on motion vector 123. Accordingly, FIG. 1 shows controller 110 sending a translational motion vector 138 to filter 106.

Such displacements may involve a fraction of the distance between pixel samples. When a motion vector specifies an integer-sample displacement, prediction block 132 comprises the corresponding pixels of the reference block. However, when a motion vector specifies a non-integer sample displacement, pixels of prediction block 132 are obtained using interpolation between reference image pixels. Accordingly, two-dimensional motion compensation filter 106 may perform such interpolations.

As shown in FIG. 1 difference block 128 is combined (e.g., summed) with prediction block 132 at combining node 108. This produces a reconstructed block 134. Reconstructed block 134 may be sent to various entitles. For instance, this block may be sent to a storage medium for assembly with other reconstructed blocks into one or more image frames. A pixel output buffer (POB) is an example of such a storage medium.

As described above, motion compensation may employ a granularity that is a fraction of the distance between pixel samples. For instance, H.264 employs a granularity of one quarter the distance between pixel samples. When a motion vector specifies an integer-sample displacement, prediction block 132 comprises the corresponding pixels of the reference block. However, when a motion vector specifies a non-integer sample displacement, the prediction block 132 is obtained using interpolation between reference image pixels.

Figure 2:
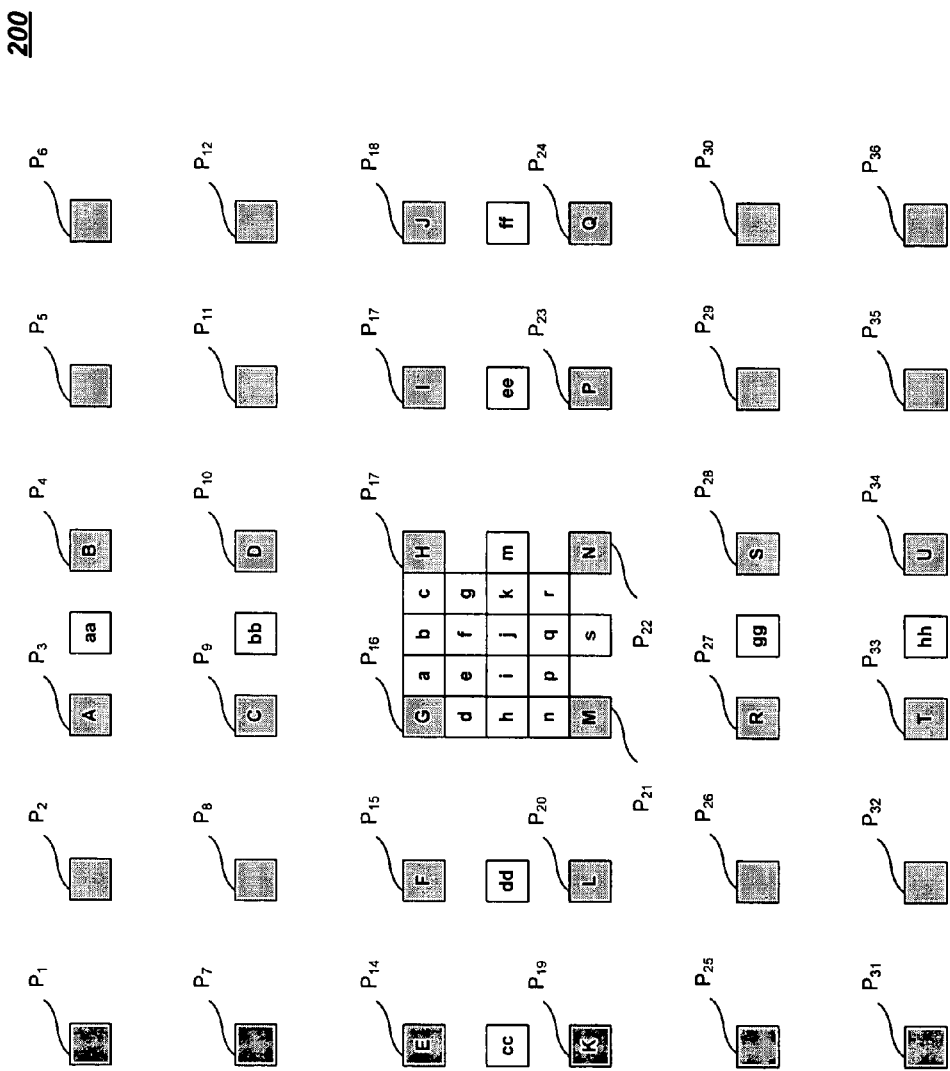
FIG. 2 is a diagram of an exemplary reference kernel.

Interpolated pixel values are based upon (or calculated from) a surrounding set of actual pixels. This set of pixels is referred to herein as a reference kernel. FIG. 2 is a diagram of an exemplary reference kernel 200. In this diagram, shaded boxes indicate actual pixels (shown as $P_1$ through $P_{36}$) within the kernel, while unshaded boxes indicate interpolated pixels. This drawing shows kernel 200 having a rectangular shape of six pixels by six pixels. Such an arrangement is employed by the H.264 video coding standard. However, embodiments of the present invention are not limited to this context. In fact, kernels of other sizes and shapes may be employed. For example embodiments may employ four pixel by four pixel reference kernels, which is the sized employed by VC-1.

FIG. 2 shows twenty pixels (shaded boxes) also having capital letter identifiers. In particular, these pixels are identified as A, B, C, D, E, F, G, H, I, J, K, L, M, N, P, Q, R, S, T, and U. In addition, FIG. 2 shows seventeen interpolated pixel positions also having single lower case letter identifiers. These interpolated pixels are identified as a, b, c, d, e, f, g, h, i, j, k, m, n, p, q, r, and s. Further, eight interpolated pixel positions are shown also having double lower case letter identifiers. These identifiers are aa, bb, cc, dd, ee, ff, gg, and hh.

The interpolated pixel positions disposed equally between two actual pixels are referred to as "half-sample" positions. In contrast, the remaining interpolated positions are referred to as "quarter-sample" positions. Accordingly, FIG. 2 shows some half-sample positions of aa, bb, cc, dd, ee, ff, gg, hh, b, h, j, m, and s. In contrast, FIG. 2 shows some quarter-sample positions of a, c, d, e, f, g, i, k, n, p, q, and r.

The prediction values at half-sample positions are obtained by applying a one-dimensional 6-tap finite impulse response (FIR) filter vertically and horizontally. For H.264, this FIR filter has the following coefficients: (1, −5, 20, 20, −5, 1) to perform the following calculation in Equation 1.

$$i_1 - 5i_2 + 20i_3 + 20i_4 - 5i_5 + i_6 \quad (1)$$

In this calculation, $i_1$ through $i_6$ represent input pixel values. These coefficients may be employed in the vertical computations shown below in Equations (2-1) through (7-2) to generate the half-sample position values of cc, dd, h, m, ee, and ff.

$$f_{cc} = P_1 - 5P_7 + 20E + 20K - 5P_{25} + P_{31} \quad (2\text{-}1)$$

$$cc = \text{Clip}(f_{cc} + 16) >> 5 \quad (2\text{-}2)$$

$$f_{dd} = P_2 - 5P_8 + 20F + 20L - 5P_{26} + P_{32} \quad (3\text{-}1)$$

$$dd = \text{Clip}(f_{dd} + 16) >> 5 \quad (3\text{-}2)$$

$$f_h = A - 5C + 20G + 20M - 5R + T \quad (4\text{-}1)$$

$$h = \text{Clip}(f_h + 16) >> 5 \quad (4\text{-}2)$$

$$f_m = B - 5D + 20H + 20N - 5S + U \quad (5\text{-}1)$$

$$m = \text{Clip}(f_m + 16) >> 5 \quad (5\text{-}2)$$

$$f_{ee} = P_5 - 5P_{11} + 20I + 20P - 5P_{29} + P_{35} \quad (6\text{-}1)$$

$$ee = \text{Clip}(f_{ee} + 16) >> 5 \quad (6\text{-}2)$$

$$f_{ff} = P_6 - 5P_{12} + 20J + 20Q - 5P_{30} + P_{36} \quad (7\text{-}1)$$

$$ff = \text{Clip}(f_{ff} + 16) >> 5 \quad (7\text{-}2)$$

Thus, each interpolated value calculated above is based on a corresponding column of actual pixels within reference kernel 200.

Moreover, the above FIR filter coefficients may be employed in the following horizontal calculations to generate the half-sample position values of j, b, and, s. The following Equations (8-1) through (10-2) provide examples of such calculations.

$$f_j = f_{cc} - 5f_{dd} + 20f_h + 20f_m - 5f_{ee} + f_{ff} \quad (8\text{-}1)$$

$$j = \text{Clip}(f_j + 512) >> 10 \quad (8\text{-}2)$$

$$f_b = E - 5F + 20G + 20H - 5I + J \quad (9\text{-}1)$$

$$b = \text{Clip}(f_b + 16) >> 5 \quad (9\text{-}2)$$

$$f_s = K - 5L + 20M + 20N - 5P + Q \quad (10\text{-}1)$$

$$s = \text{Clip}(f_s + 16) >> 5 \quad (10\text{-}2)$$

In the above Equations the Clip function is defined as follows:

$$\text{Clip}(x) = \text{Clip3}(0, (1 << \text{BitDepth}_y) - 1, x), \text{ where}$$

$$Clip3(x, y, z) = \begin{cases} x; & z < x \\ y; & z > y \\ z; & \text{otherwise} \end{cases}, \text{ and}$$

BitDepth$_y$ is the number of bits used to specify the value of pixels

Prediction values at quarter-sample positions are generated by averaging samples at actual pixel and half-sample positions. For instance, the following Equations (11) through (22) may be used to generate quarter-sample position values a, c, d, e, f, g, i, k, n, p, q, and r.

$$a = (G+b+1) >> 2 \qquad (11)$$

$$c = (H+b+1) >> 2 \qquad (12)$$

$$d = (G+h+1) >> 2 \qquad (13)$$

$$e = (b+h+1) >> 2 \qquad (14)$$

$$f = (b+j+1) >> 2 \qquad (15)$$

$$g = (b+m+1) >> 2 \qquad (16)$$

$$i = (h+j+1) >> 2 \qquad (17)$$

$$k = (m+j+1) >> 2 \qquad (18)$$

$$n = (M+h+1) >> 2 \qquad (19)$$

$$p = (s+h+1) >> 2 \qquad (20)$$

$$q = (s+j+1) >> 2 \qquad (21)$$

$$r = (s+m+1) >> 2 \qquad (22)$$

Figure 3:
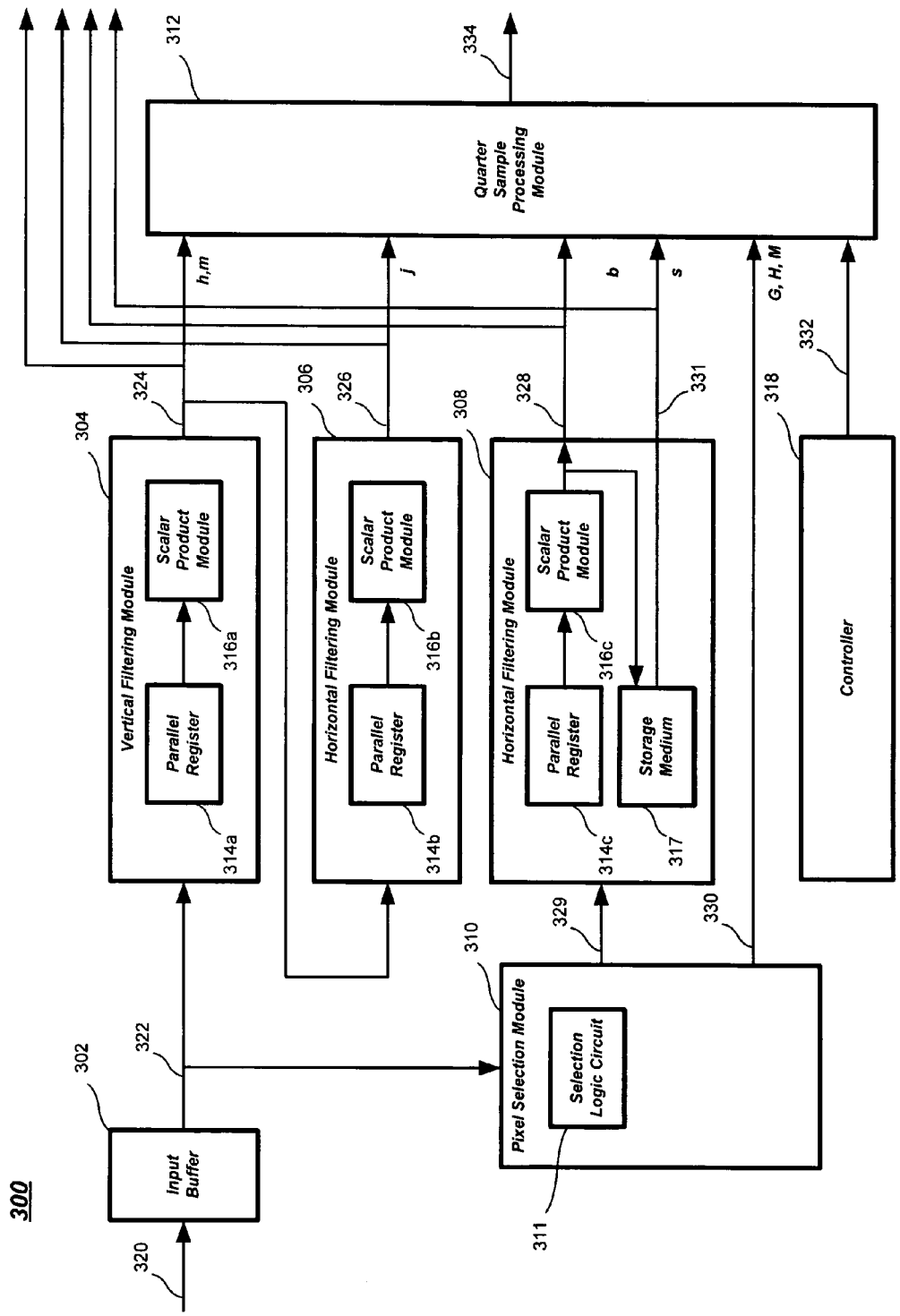
FIG. 3 is a block diagram of an implementation that may perform pixel interpolation within a motion compensation element.

FIG. 3 is a block diagram of an implementation 300 that may perform pixel interpolation within a motion compensation element, such as two-dimensional motion compensation filter 106. As shown in FIG. 3, implementation 300 may include various elements. The embodiments, however, are not limited to the elements shown in this drawing. For instance, embodiments may include greater or fewer elements, as well as other arrangements, couplings, or connections among elements.

FIG. 3 shows that implementation 300 may include an input buffer 302, a vertical filtering module 304, a first horizontal filtering module 306, a second horizontal filtering module 308, a pixel selection module 310, a quarter-sample computation module 312, and a controller 318.

Input buffer 302 receives and stores actual pixel values 320 of reference images. Accordingly, these values may be received from a memory, such as reference memory 104. In embodiments, pixel values are received serially, (e.g., one at a time) in a predetermined order. An exemplary order follows a vertical zig-zag pattern. In such a pattern, pixels are received in a column by column sequence. Further details regarding the receiving and storage of such pixels values are described below with reference to FIGS. 5 and 6A-6D.

From its stored pixel values, input buffer 302 sends a pixel value stream 322 to vertical filtering module 304 and pixel selection module 310. Pixel value stream 322 may be output serially. However, in embodiments, it may be output in a parallel manner.

FIG. 3 shows that vertical filtering module 304 includes a parallel register 314a and a scalar product module 316a. Parallel register 314a has a capacity to store (or accumulate) a plurality of pixel values. Each accumulation of pixel values from pixel value stream 322 may comprise a column of pixel values from a reference kernel (e.g., reference kernel 200). From each accumulated reference kernel column, scalar product module 316a may calculate a scalar product (or sum of products). Such calculations may employ coefficients (such as the aforementioned FIR filter coefficients) to perform half-sample interpolations.

Thus, for each column of actual pixel values stored by parallel register 314a, scalar product module 316a may calculate a corresponding half-sample interpolated value. With reference to the exemplary H.264 reference kernel of FIG. 2, such corresponding interpolated values may include cc, dd, h, m, ee, and ff.

These values are shown as interpolated pixel values 324, which are sent to horizontal filtering module 306. FIG. 3 shows that a portion of these values (such as h and m) may be sent to quarter-sample computation module 312.

As shown in FIG. 3, horizontal filtering module 306 receives interpolated pixel values 324 and stores them in a parallel register 314b. As described above, these values may include cc, dd, h, m, ee, and ff. As shown in FIG. 2, these values are aligned horizontally. Thus, module 306 may perform a horizontal filtering operation on these interpolated values to generate at least one interpolated pixel value 326. This filtering operation may use, for example, the FIR filter coefficients described above. In the context of H.264, this filtering operation calculates the half-sample interpolated pixel value of j.

FIG. 3 shows that pixel selection module 310 receives pixel value stream 322 from input buffer 302. From this stream, pixel selection module 310 may obtain particular reference kernel pixel values. Accordingly, pixel selection module 310 may include selection logic 311 to select such values.

In embodiments employing H.264, pixel selection module 310 may obtain predetermined pixel values from reference kernel 200. For instance, pixel selection module 310 may obtain actual pixel values E, F, G, H, I, and J for the calculation of interpolated pixel value b. Moreover, for the calculation of interpolated pixel value s, pixel selection module 310 may obtain actual pixel values K, L, M, N, P, and Q. Such pixel values may be sent to horizontal filtering module 308.

In addition, pixel selection module 310 may obtain and send actual pixel values to quarter-sample computation module 312. For instance, FIG. 3 shows actual pixel value(s) 330 being sent to computation module 312. In embodiments employing H.264, these values may be reference pixel values G, H, and M.

As shown in FIG. 3, Horizontal filtering module 308 receives actual reference kernel pixel value(s) 329 from pixel selection module 310. Similar to modules 304 and 306, horizontal filtering module 308 includes a parallel register 314c and a scalar product module 316c. These elements provide for the accumulation of pixel values and the calculation of corresponding interpolations. In embodiments employing H.264, horizontal filtering module 308 may obtain actual pixel values E, F, G, H, I, and J for the calculation of interpolated pixel value b, as well as values K, L, M, N, P, and Q for the calculation of interpolated pixel value s. Accordingly, FIG. 3 shows filter module 308 outputting such values as interpolated pixel value(s) 328 and 331.

This calculation and output within horizontal filtering module 308 may be performed sequentially. For instance, FIG. 3 shows scalar product module 316c outputting a value a sending it to storage medium 317. As shown in FIG. 3, this value may become interpolated pixel value 331 (e.g., value s). Also, FIG. 3 shows scalar product module 316c outputting a value that is directly used as interpolated pixel value 328 (e.g., value b). In embodiments, sequential performance may be based on a sequential manner in which parallel register 314c receives actual pixel values from pixel selection module 310.

FIG. 3 shows that quarter-sample computation module 312 receives half-sample interpolated pixel values 324, 326, 328, and 331. In addition, quarter-sample computation module 312 receives actual pixel value(s) 330. From these values, module 312 may generate one or more quarter-sample interpolated pixels. Such generation may be based on a selection signal 332 received from controller 318.

To implement such features, quarter-sample computation module 312 may include a network of multiplexers arranged in one or more stages. Such a network may be used to select a pairing of pixel values. Following the network of multiplexers, syntax parsing module 112 may include one or more arithmetic units to calculate selected quarter-sample pixel values. As expressed above in Equations 11 through 22, such calculations may involve addition and shifts.

Operation of implementation 300 may involve three time intervals for each reference kernel. For instance, in a first time interval (also referred to as a "first tick"), vertical filtering module 304 accumulates pixel values for each kernel column and calculates each of the corresponding half-sample interpolated pixel values 324.

Following the first time interval, a second time interval (also referred to as a "second tick") occurs. In this time interval, horizontal filtering module 306 may receive pixel values 324 and calculate interpolated pixel value 326. As described above, this scalar product may be half-sample pixel value j. Also during the second tick, horizontal filtering module 308 may generate half-sample pixel values b and s. However, this generation may alternatively occur in the first tick.

After the second time interval, a third time interval (also referred to as a "third tick") occurs. During the third time interval, quarter-sample computation module 312 generates one or more quarter-sample interpolated pixels, as directed by controller 318. Controller 318 may direct computation module based on instruction(s) received from another element. For example, may receive such instructions from controller 110.

FIG. 3 shows that implementation 300 may output interpolated pixel values 324, 326, 328, 331, and/or 334. This output may be used in the formation of a prediction block, such as prediction block 132.

Implementation 300 provides improvements over conventional interpolation filtering approaches. This is because both vertical and horizontal filtering are directly coupled. In contrast many conventional approaches may have isolated vertical and horizontal filtering components. This isolation typically mandates the placement of one or more components, such as a transform module (as well as potential buffering) between the isolated filtering components. Such components (as well as duplication in each filtering component) increases processing loads, reduces throughput, increases circuitry costs, and raises power consumption. The techniques described herein may advantageously reduce such undesirable effects.

In embodiments of the present invention, implementation 300 may be scaled to have multiple instances of one or more of its elements. For instance, embodiments may include multiple instances of vertical filtering module 304, first horizontal filtering module 306, second horizontal filtering module 308, and/or quarter-sample computation module 312. Such multiple instances may occur in any combination.

This scalability feature may provide enhanced processing capacity in generating pixel interpolations. Also, such scaling may only require small incremental increase in circuitry (e.g., gate count).

Figure 4:
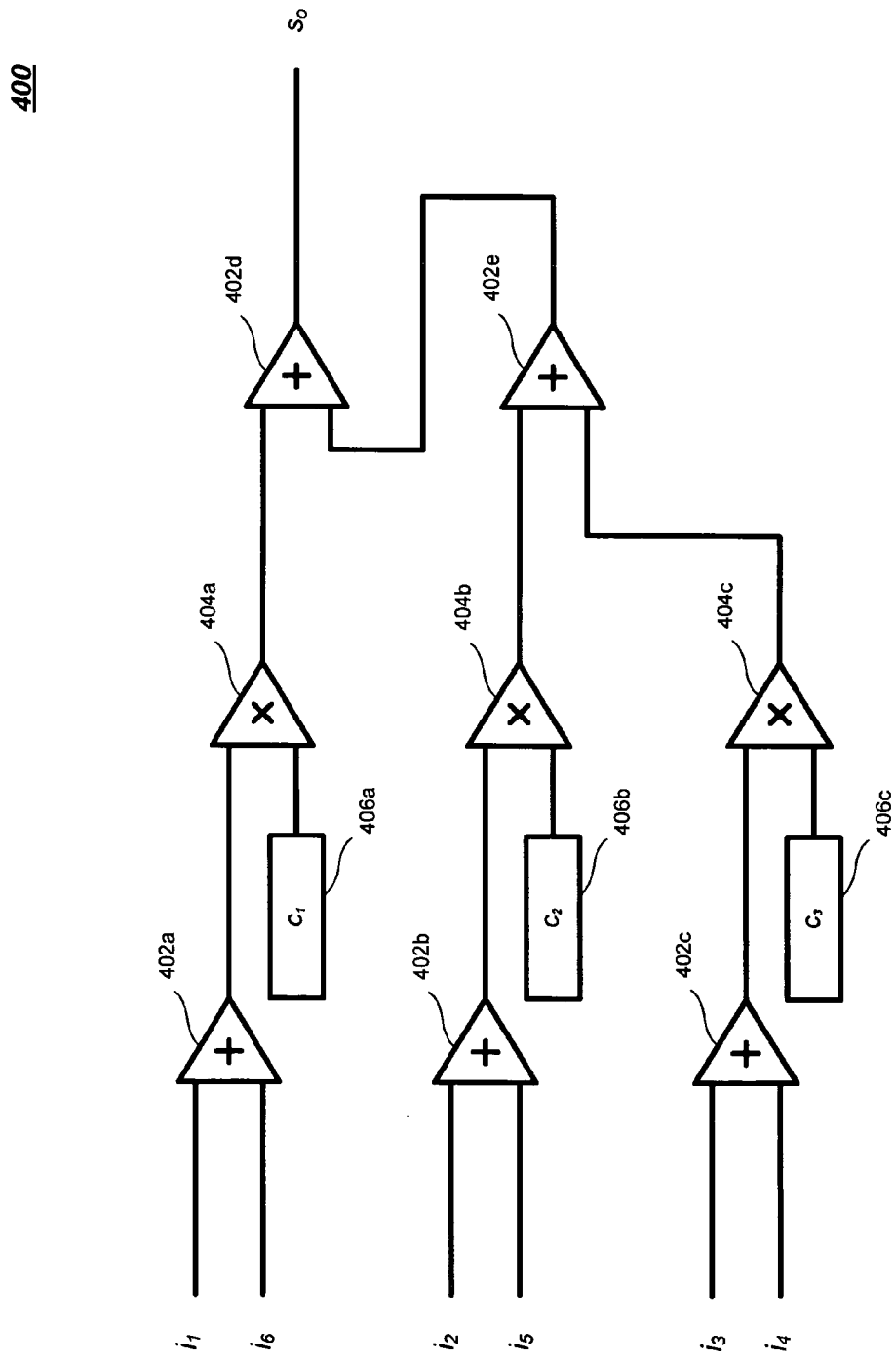
FIG. 4 is a block diagram showing an arrangement that may be used to calculate scalar products.

FIG. 4 is a block diagram showing an exemplary arrangement 400 that may be used to calculate scalar products. Accordingly, with reference to FIG. 3, this arrangement may be included in scalar product modules 316. As shown in FIG. 4, implementation 400 may include a plurality of addition nodes 402, a plurality of multiplication nodes 404, and multiple coefficient value storage elements 406. However, the embodiments are not limited to these elements. For instance, embodiments may include greater or fewer elements, as well as other arrangements, couplings, or connections among elements.

As shown in FIG. 4, multiple input values $i_1$ through $i_6$ are received by addition nodes 402a, 402b, and 402c. In particular, input signals $i_1$ and $i_5$ are received and added by node 402a, input signals $i_2$ and $i_5$ are received and added by node 402b, and input signals $i_3$ and $i_4$ are added by node 402c.

Each of these nodes produces a sum, which is multiplied with a corresponding coefficient at a corresponding multiplication node 404. For example, at node 404a the corresponding sum is multiplied with a coefficient $c_1$, at node 404b the corresponding sum is multiplied with a coefficient $c_2$, and at node 404c the corresponding sum is multiplied with a coefficient $c_3$. FIG. 4 shows that the results of these multiplications are added together by addition nodes 402e and 402f. As a result, a scalar output product so is produced.

Implementation 400 may be used to perform filtering operations, such as the H.264 FIR filter calculation expressed above in Equation 1. Thus, in such implementations, $c_1$ may equal 1, $c_2$ may equal −5, and $C_3$ may equal 20.

Figure 5:
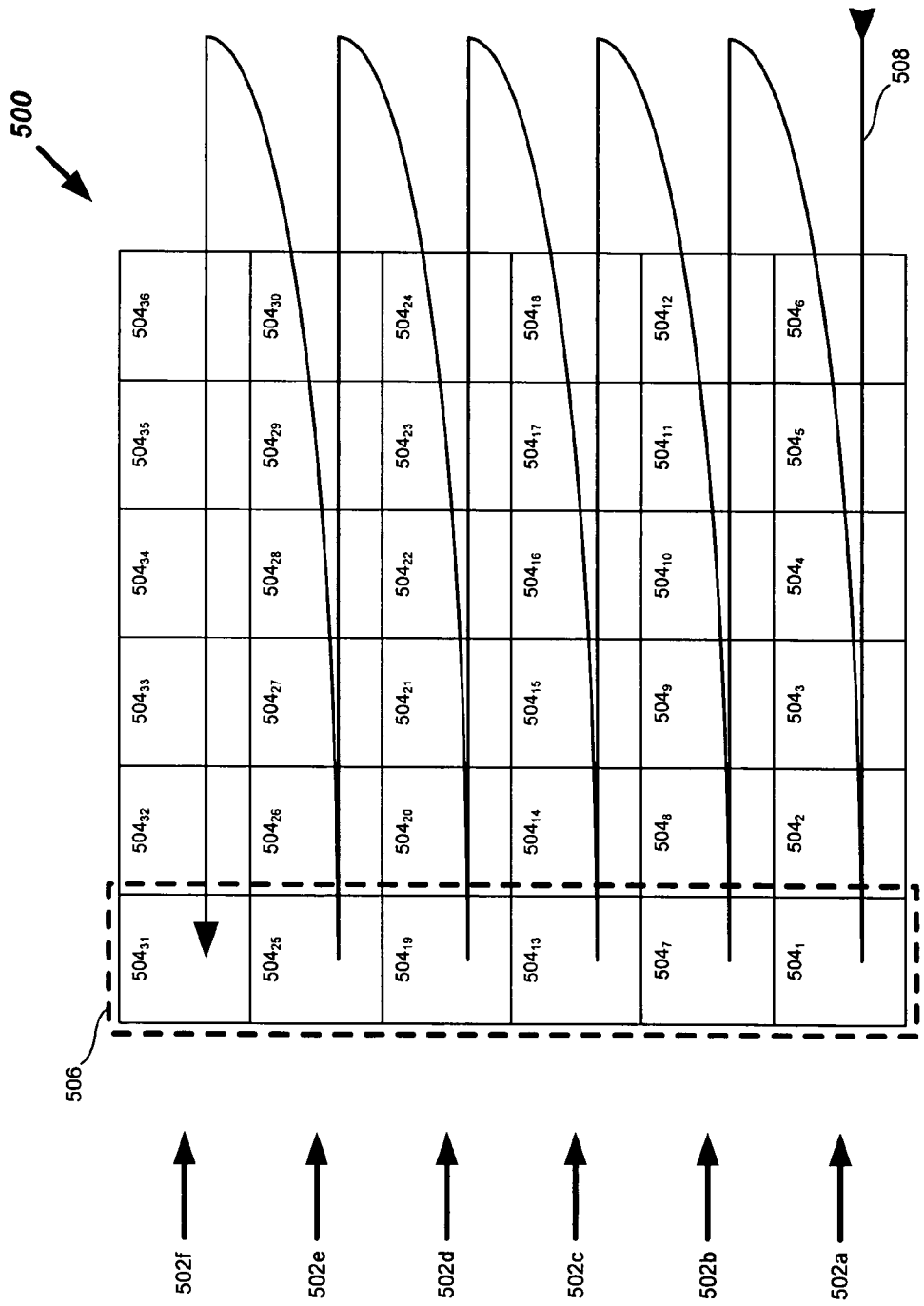
FIG. 5 is a diagram illustrating input buffering techniques.

FIG. 5 is a diagram illustrating input buffering techniques. These techniques may be employed, for example, by input buffer 302. FIG. 5 shows a buffer storage medium (e.g., memory) 500 having multiple rows 502. Each of these rows includes multiple individual storage elements 504. For example, row 502a includes storage elements $504_1$-$504_6$. Each storage element may store a pixel value, such as pixel values for one or more reference kernels that are being serially received. A path 508 shows a zig-zag order in which buffer storage medium 500 receives and updates its entries as values are received.

FIG. 5 also shows storage medium 500 having an access portion 506. This access portion comprises storage elements 504 from which pixel values may be accessed. As shown in FIG. 5, this access portion comprises a storage element from each row 502, wherein each of these storage elements are aligned in the same column. In particular, FIG. 5 shows access portion 506 comprising storage elements $504_1$, $504_7$, $504_{13}$, $504_{19}$, $504_{25}$, and $504_{31}$.

Figure 6B:
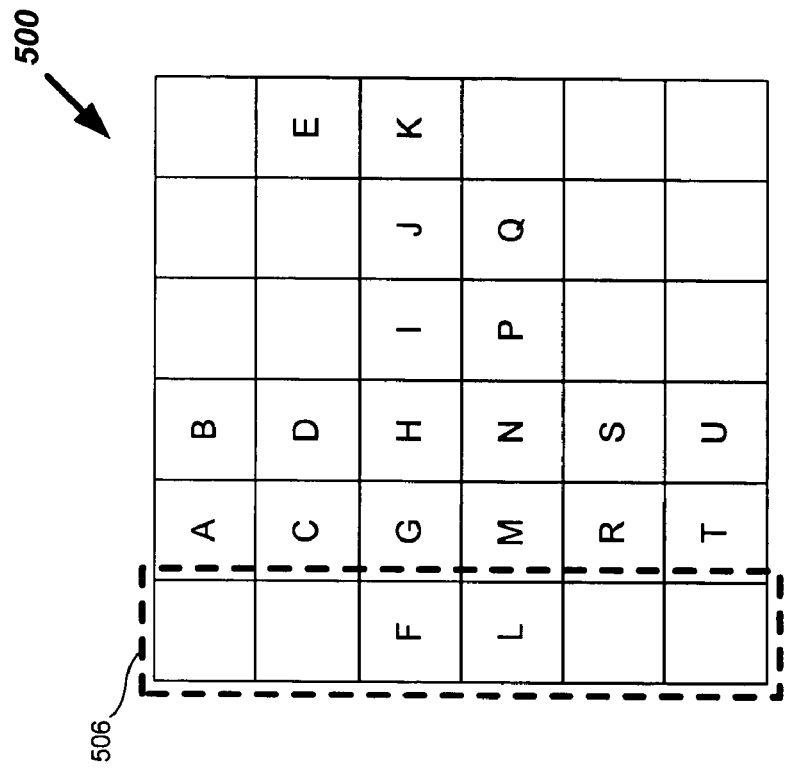
FIGS. 6A-6D show a sequence in which reference kernel pixels are received in a buffer storage medium.
Figure 6A:
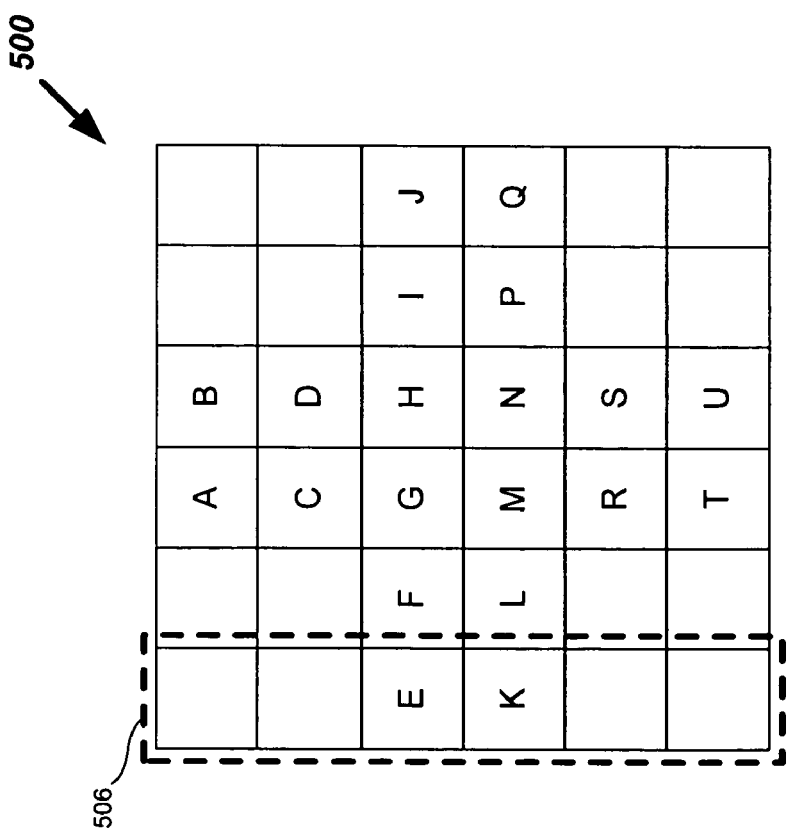
Figure 6D:
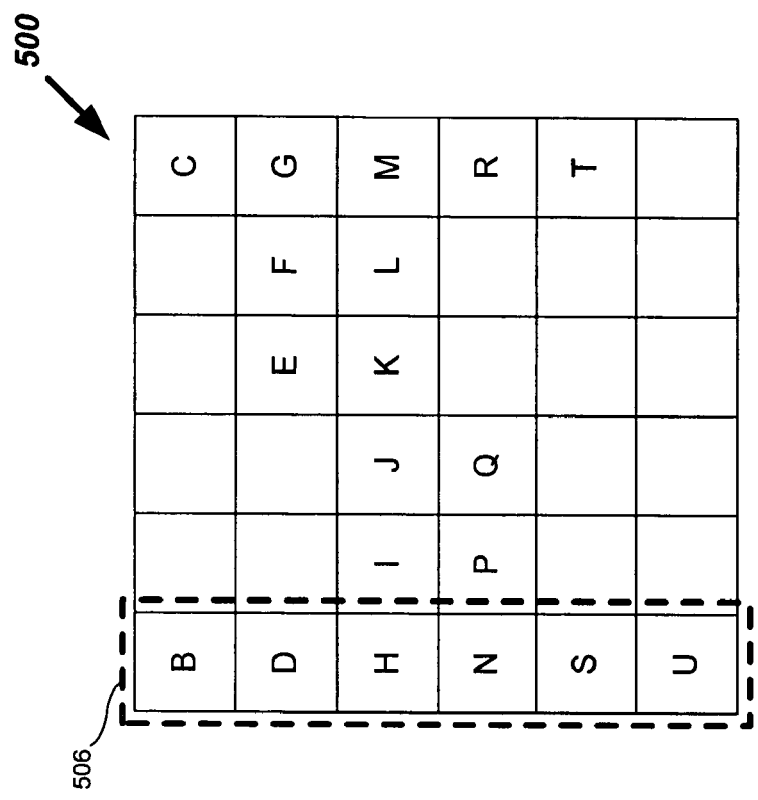
Figure 6C:
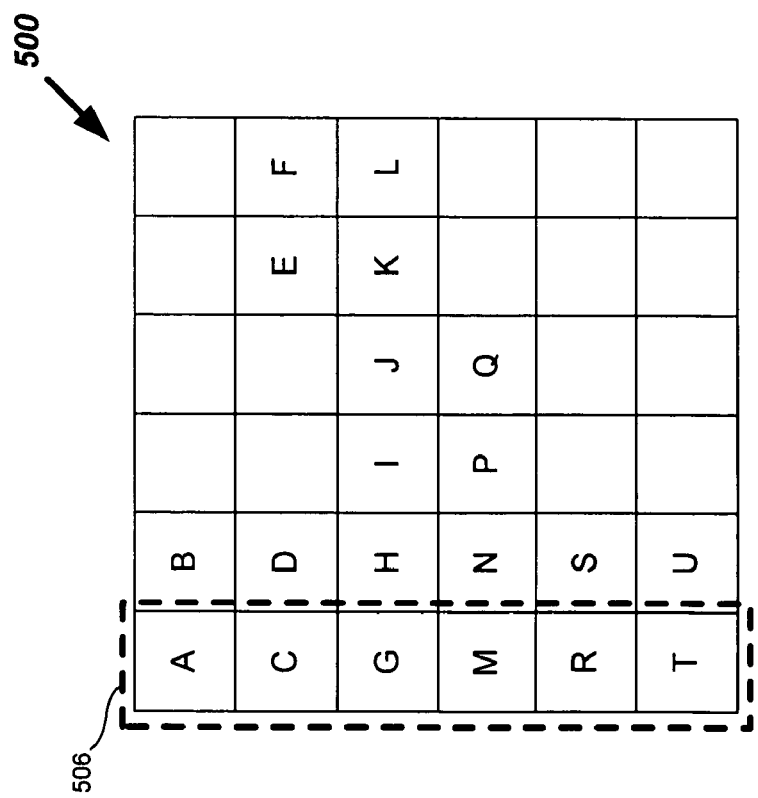

FIGS. 6A-6D show a sequence in which reference kernel pixels are received in buffer storage medium 500. This sequence is described with respect to the reference kernel of FIG. 2. In particular, FIG. 6A shows a first time when access portion 506 contains actual pixels E and K. Subsequently, after the contents of storage medium 500 have been shifted, FIG. 6B shows access portion 506 containing actual pixels F and L. Next, FIG. 6C shows access portion 506 containing actual pixels A, C, G, M, R, and T. Also, FIG. 6D shows access portion 506 containing actual pixels B, D, H, N, S, and U.

Thus, these features advantageously allow columns within a reference kernel to be accessed for vertical filtering without complex memory management or access techniques.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 7:
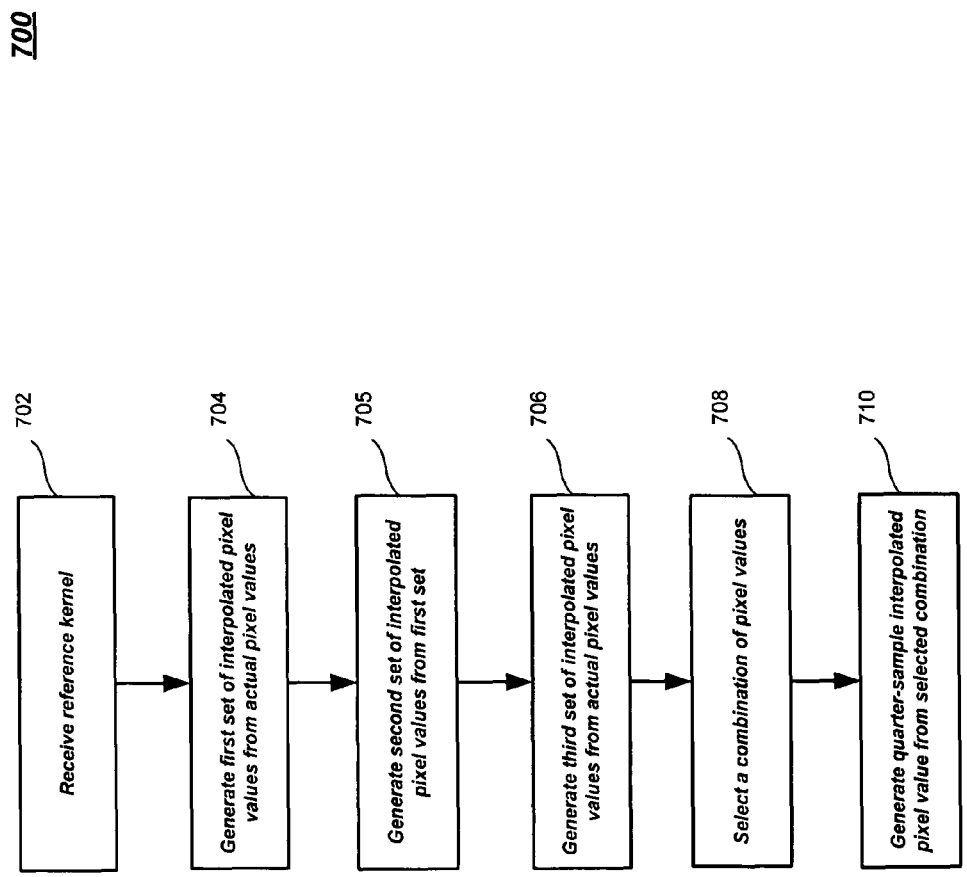
FIG. 7 illustrates one embodiment of a logic diagram.

FIG. 7 illustrates one embodiment of a logic flow. In particular, FIG. 7 illustrates a logic flow 700, which may be representative of the operations executed by one or more embodiments described herein. As shown in FIG. 7, a reference kernel is received at a block 702. As described above, the reference kernel includes multiple actual pixel values. This kernel may be various sizes. For instance, exemplary sizes include four pixels by four pixels and six pixels by six pixels. Block 702 may be implemented by input buffer 302.

A first set of one or more half-sample interpolated pixel values is generated at block 704. Each of these interpolated values in this set is generated from actual pixel values aligned in a first direction, such as vertically. Thus, block 704 may be implemented by vertical filtering module 304. With reference to H.264, this set may include interpolated values cc, dd, h, m, ee, and ff.

A second set of one or more half-sample interpolated pixel values is generated at a block 705. This set is generated from the interpolated pixel values generated at block 704. Also, this set may be generated through a filtering operation in a second (e.g., horizontal) direction. With reference to H.264, this second set may include interpolated pixel value j. Block 705 may be implemented, for example, by horizontal filtering module 306.

At a block 706, a third set of one or more half-sample interpolated pixel values may be generated. This generation may be from actual pixel values in the reference kernel through a filtering operation in the second (e.g., horizontal) direction. In the context of FIG. 3, block 706 may be implemented by filtering module 308. With reference to H.264, this third set of interpolated values may include b and s.

At a block 708, selection of a combination of one or more pixel values occurs. This selection may be from among the actual pixel values, and the three sets of interpolated pixel values. At a block 710, a quarter-sample interpolated pixel value is generated from the combination of values selected at block 708. With reference to FIG. 3, the selection and generation of blocks 708 and 710 may be implemented by quarter-sample computation module 312.

Figure 8:
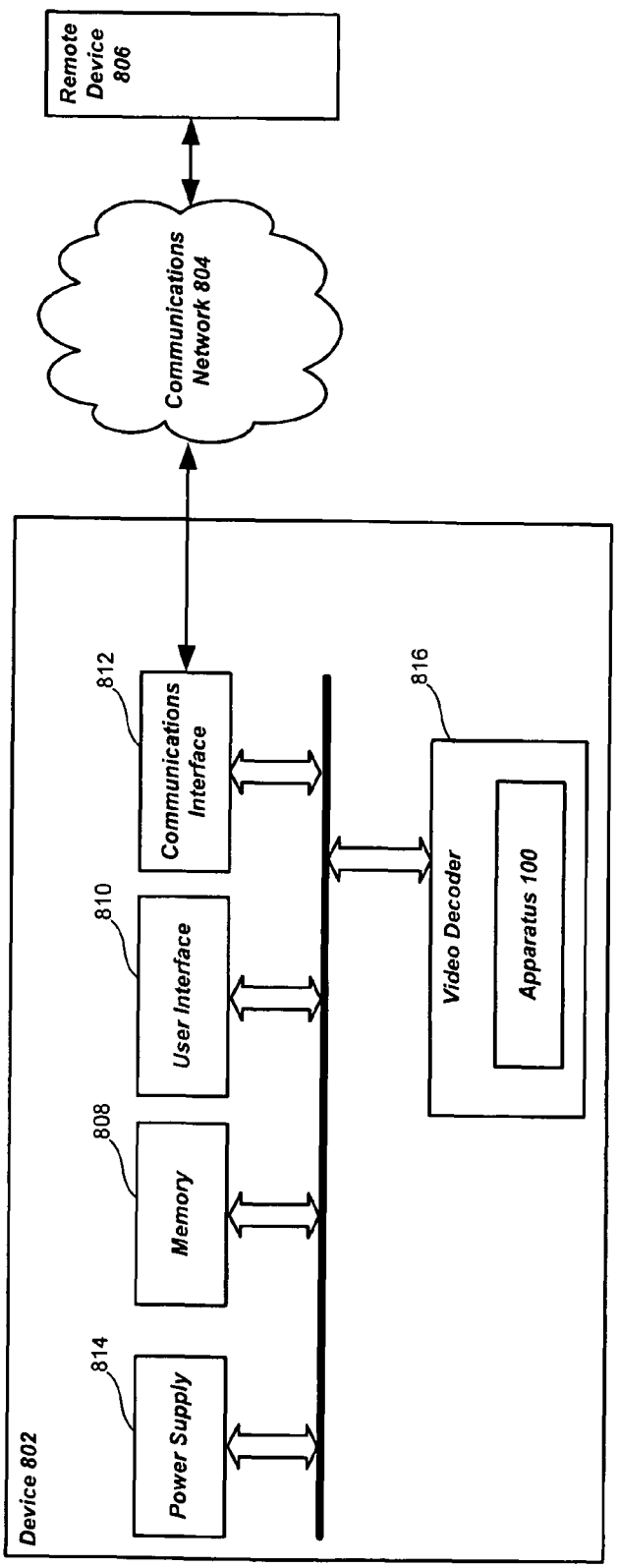
FIG. 8 illustrates one embodiment of a system.

FIG. 8 illustrates an embodiment of a system 800. This system may be suitable for use with one or more embodiments described herein, such as apparatus 100, implementation 300, logic flows 700, and so forth. Accordingly, system 800 may decode video signals according to techniques, such as the ones described herein. In addition, system 800 may display images and store corresponding data. Moreover, system 800 may exchange image data with remote devices.

As shown in FIG. 8, system 800 may include a device 802, a communications network 804, and one or more remote devices 806. FIG. 8 shows that device 802 may include a video decoder having the elements of FIG. 1. In addition, device 802 may include a memory 808, a user interface 810, a communications interface 812, and a power supply 814.

Memory 808 may store information in the form of data. For instance, memory 808 may contain images in either encoded or unencoded formats. Also, memory 808 may store reference images, as well as buffered data. Alternatively or additionally, memory 808 may store control logic, instructions, and/or software components. These software components include instructions that can be executed by one or more processors. Such instructions may provide functionality of one or more elements in system 800.

Memory 808 may be implemented using any machine-readable or computer-readable media capable of storing data, including both volatile and non-volatile memory. For example, memory 808 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 808 may be included in other elements of system 800. Alternatively some portion or all of memory 808 may be disposed on an integrated circuit or other medium, for example a hard disk drive, which is external. The embodiments are not limited in this context.

User interface 810 facilitates user interaction with device 802. This interaction may involve the input of information from a user and/or the output of information to a user. Accordingly, user interface 810 may include one or more devices, such as a keypad, a touch screen, a microphone, and/or an audio speaker. In addition, user interface 810 may include a display to output information and/or render images/video processed by device 802. Exemplary displays include liquid crystal displays (LCDs), plasma displays, and video displays.

Communications interface 812 provides for the exchange of information with other devices across one or more communications networks. This information may include image and/or video signals received by device 802 from remote device(s) 806.

Communications interface 812 may provide for wireless or wired communications. For wireless communications, communications interface 812 may include components, such as a transceiver, an antenna, and control logic to perform operations according to one or more communications protocols. Thus, communications interface 812 may communicate across wireless networks according to various protocols. For example, devices 802 and 806 may operate in accordance with various wireless local area network (WLAN) protocols, such as the IEEE 802.11 series of protocols, including the IEEE 802.11a, 802.11b, 802.11e, 802.11g, 802.11n, and so forth. In another example, these devices may operate in accordance with various wireless metropolitan area network (WMAN) mobile broadband wireless access (MBWA) protocols, such as a protocol from the IEEE 802.16 or 802.20 series of protocols. In another example, these devices may operate in accordance with various wireless personal area networks (WPAN). Such networks include, for example, IEEE 802.16e, Bluetooth, and the like. Also, these devices may operate according to Worldwide Interoperability for Microwave Access (WiMax) protocols, such as ones specified by IEEE 802.16.

Also, these devices may employ wireless cellular protocols in accordance with one or more standards. These cellular standards may comprise, for example, Code Division Multiple Access (CDMA), CDMA 2000, Wideband Code-Division Multiple Access (W-CDMA), Enhanced General Packet Radio Service (GPRS), among other standards. The embodiments, however, are not limited in this context.

For wired communications, communications interface 812 may include components, such as a transceiver and control logic to perform operations according to one or more communications protocols. Examples of such communications protocols include Ethernet (e.g., IEEE 802.3) protocols, integrated services digital network (ISDN) protocols, public switched telephone network (PSTN) protocols, and various cable protocols.

In addition, communications interface 812 may include input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Power supply 814 provides operational power to elements of device 802. Accordingly, power supply 814 may include an interface to an external power source, such as an alternating current (AC) source. Additionally or alternatively, power supply 814 may include a battery. Such a battery may be removable and/or rechargeable. However, the embodiments are not limited to this example.

Each of the elements of device 802 may be coupled in various ways. For instance some or all of these elements may be coupled by a bus architecture. Additionally or alternatively, direct couplings may exist between some or all of these elements.

As described above, various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. For instance, the present invention is not limited to H.264. For instance, embodiments may employ other standards or approaches. Examples of such standards include VC-1, ITU standard, AVS, as well as other standards. Moreover, embodiments of the present invention may be capable of multi-format or multi-standard decoding. Thus, the specific features and acts described herein are disclosed as example forms of implementing the claims.

The invention claimed is:

1. An apparatus, comprising:
   an input buffer to receive a reference kernel, the reference kernel comprising multiple actual pixel values;
   a first filtering module to produce, through filtering in a first direction, a first set of one or more half-sample interpolated pixel values from a plurality of the actual pixel values;
   a second filtering module coupled serially to the first filtering module to produce, through filtering in a second direction, a second set of one or more half-sample interpolated pixel values from the first set of one or more half-sample interpolated pixel values;
   a third filtering module, parallel to the first filtering module, to produce through filtering in a second direction, a third set of one or more half-sample interpolated pixel values from a plurality of the actual pixel values substantially simultaneously with the second filtering module;
   a logic circuit to generate a quarter-sample interpolated pixel value from a combination of pixel values selected from the actual pixel values, the first set of interpolated pixel values, the second set of interpolated pixel values, and the third set of interpolated pixel values.

2. The apparatus of claim 1, wherein the logic circuit includes an addition circuit to add said selected combination of pixel values.

3. The apparatus of claim 1, wherein the first, second, and third filtering modules each comprise:
   a parallel register to store multiple pixel values; and a scalar product computation circuit to calculate a scalar product from the multiple pixel values.

4. The apparatus of claim 1, wherein the first direction is vertical and the second direction is horizontal.

5. The apparatus of claim 1, wherein the input buffer comprises:
an array of storage elements having a plurality of rows and a plurality of columns, the array configured to update stored pixel values in a zig-zag pattern, the zig-zag pattern traversing each of the rows in a same direction.

6. The apparatus of claim 5, wherein the input buffer comprises:
an access portion comprising a column of the storage elements within the array of storage elements;
wherein the access portion is to provide access to pixel values stored in the input buffer.

7. The apparatus of claim 1, wherein the reference kernel is a six pixel by six pixel rectangular region.

8. The apparatus of claim 1, wherein the reference kernel is a four pixel by four pixel rectangular region.

9. The apparatus of claim 1, wherein the first filtering module is directly coupled to the second filtering module.

10. A method, comprising:
(a) receiving a reference kernel in an input buffer, the reference kernel comprising multiple actual pixel values;
(b) generating, in a quarter-sample computation module, a first set of one or more half-sample interpolated pixel values, wherein each interpolated pixel value of the first set is generated from a corresponding plurality of the actual pixel values having an alignment in a first direction;
(c) generating, in the quarter-sample computation module, a second set of one or more half-sample interpolated pixel values from the first set of one or more half-sample interpolated pixel values; and
(d) generating, in the quarter-sample computation module, a third set of one or more half-sample interpolated pixel values, wherein each interpolated pixel value of the third set is generated from a corresponding plurality of the actual pixel values having an alignment in a second direction wherein the generating is substantially in parallel with generating the second set of half-sample interpolated pixel values.

11. The method of claim 10, further comprising:
selecting a combination of one or more pixel values, the one or more pixels selected from the actual pixel values, the first set of interpolated pixel values, the second set of interpolated pixel values, and the third set of interpolated pixel values; and
generating a quarter-sample interpolated pixel value from the selected combination of one or more pixel values.

12. The method of claim 10, wherein generating the quarter-sample interpolated pixel value comprises adding the selected combination of one or more pixel values.

13. The method of claim 9, wherein the first direction is vertical and the second direction is horizontal.

14. An apparatus, comprising:
a first filtering module to filter actual pixel values in a vertical direction;
a second filtering module coupled serially to the first filtering module to filter interpolated pixel values received from the first filtering module in a horizontal direction;
a third filtering module to filter actual pixels in a horizontal direction substantially simultaneously with the second filtering module; and
a computation module coupled to the first, second and, third filtering modules, the computation module to generate quarter-sample interpolated pixel values based on combinations of pixel values selected from actual pixel values and interpolated pixel values received from the first, second and, third filtering modules.

15. The apparatus of claim 14, comprising an input buffer, wherein the input buffer includes:
an access portion comprising a column of the storage elements within the array of storage elements;
wherein the access portion is to provide access to pixel values stored in the input buffer.

16. The apparatus of claim 15, wherein the first, second, and third filtering modules are coupled to the input buffer.

17. The apparatus of claim 1, wherein the first filtering module is directly coupled to the second filtering module.

18. A system, comprising:
a input signal processing path to generate a difference block from an encoded input signal;
a reference memory to store a reference image;
a motion compensation filter to generate a motion compensated prediction block from the reference image;
a combining node to generate a reconstructed block from the difference block and the prediction block;
wherein the motion compensation filter includes
one or more first filtering modules to filter actual pixel values in a first direction;
one or more second filtering modules each coupled serially to one of the one or more first filtering modules to filter interpolated pixel values received from the one or more first filtering modules in a second direction,
one or more third filtering modules to filter actual pixels in the second direction each filtering substantially in parallel with one of the one or more second filtering modules, and
one or more computation modules coupled to the one or more first, second and, third filtering modules, the computation module to generate quarter-sample interpolated pixel values based on combinations of pixel values selected from actual pixel values and interpolated pixel values received from the one or more first, second and, third filtering modules.

19. The system of claim 18, wherein the first direction is vertical and the second direction is horizontal.

20. The system of claim 18, further comprising an output device to display the reconstructed block.

* * * * *